R. W. STEPHENS.
DYNAMOMETER FOR CASING SCREWERS AND OTHER PURPOSES.
APPLICATION FILED NOV. 1, 1911.
1,080,937.
Patented Dec. 9, 1913.
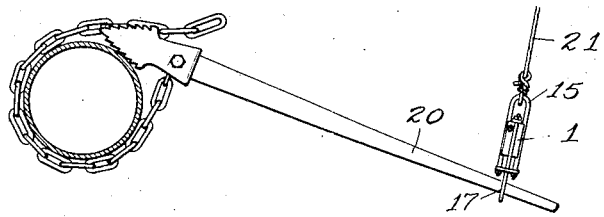
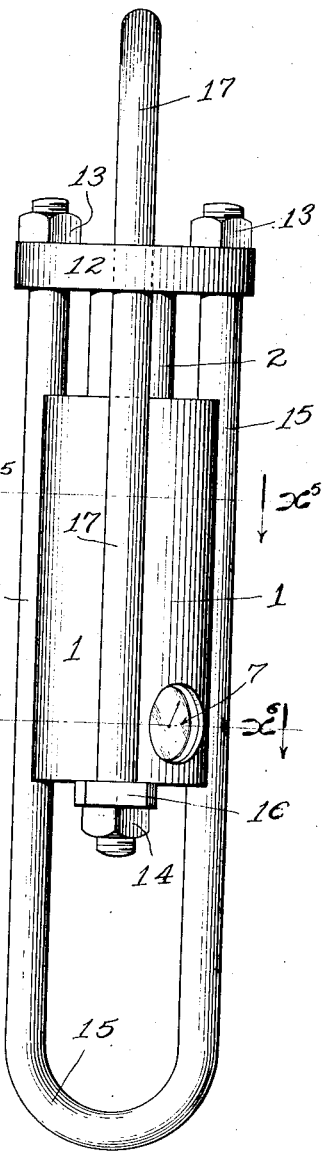
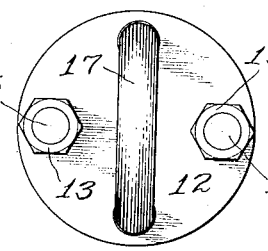
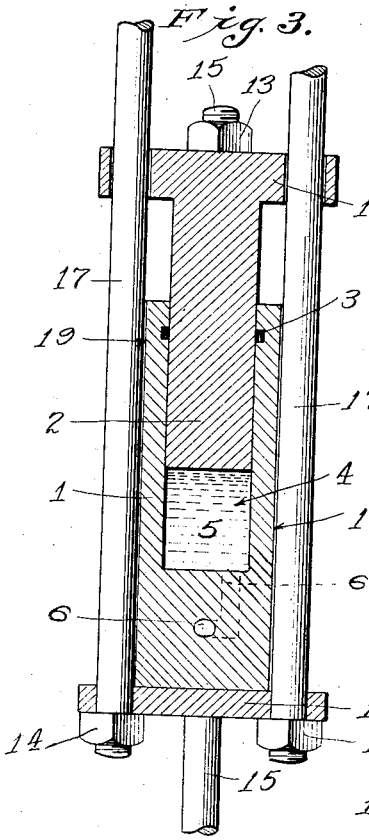
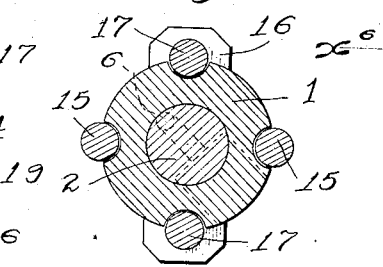
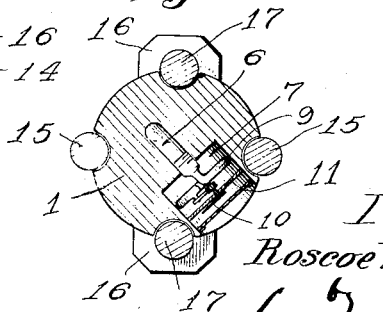
Witnesses:
Inventor:
Roscoe William Stephens.

UNITED STATES PATENT OFFICE.

ROSCOE WILLIAM STEPHENS, OF MARICOPA, CALIFORNIA.

DYNAMOMETER FOR CASING-SCREWERS AND OTHER PURPOSES.

1,080,937.

Specification of Letters Patent. Patented Dec. 9, 1913.

Application filed November 1, 1911. Serial No. 658,055.

*To all whom it may concern:*

Be it known that I, ROSCOE WILLIAM STEPHENS, a citizen of the United States, residing at Maricopa, in the county of Kern and State of California, have invented a new and useful Dynamometer for Casing-Screwers and other Purposes, of which the following is a specification.

This invention relates to an improved form of dynamometer adapted for insertion in a tension line to indicate the amount of tension on said line and the main object of the invention is to provide a hydraulically operated dynamometer for this purpose, thereby dispensing with the use of powerful and heavy springs, said dynamometer comprising hydraulic means operating a pressure gage and being provided with means for attachment to the line in such manner that tension on the line produces compression in the hydraulic operating means for the pressure gage.

Other objects of the invention will appear hereinafter.

The accompanying drawings illustrate an embodiment of my invention, and referring thereto: Figure 1 is a plan of the strain indicating means in position on the casing in connection with the casing screwing device, the casing being shown in section. Fig. 2 is a side elevation of the dynamometer. Fig. 3 is a vertical section of a portion thereof. Fig. 4 is a plan of the dynamometer. Fig. 5 is a section on line $x^5$—$x^5$ in Fig. 2. Fig. 6 is a section on line $x^6$—$x^6$ in Fig. 2.

The dynamometer or strain indicator comprises a cylinder 1 closed at its lower end and a piston 2 mounted to slide in said cylinder, a packing ring or leather cup 3 being provided in the wall of the cylinder to give a tight sliding joint. The space 4 within the cylinder and below the piston is occupied by liquid indicated at 5 and a channel 6 is formed in the closed lower end of the cylinder leading to a recess 7 in the side of the lower end portions of the cylinder. A pressure gage of any suitable type is provided in said recess, the operative or pressure receiving member 9 of said pressure gage being connected to or communicating with the channel 6 aforesaid, to receive the pressure from the cylinder. The pointer 10 for said gage indicates on a dial 11 the pressure existing in the member 9 and in the interior of cylinder 1.

Piston 2 is formed with a cross head 12 with which engage nuts 13 on the screw threaded end portions of the longitudinal bars of a U-shaped stirrup or member 15. A plate 16 extends beneath the closed lower end of cylinder 1, and engages with nuts 14 screwing on the screw threaded lower ends of the longitudinal bars of a U-shaped stirrup or member 17, the members 15 and 17 serving for attachment of the parts for applying tension or strain to the device. Members 15 and 17 extend alongside the cylinder 1 and engage in longitudinal grooves 19 in the cylinder 1, thereby maintaining the parts in axial alinement. The respective tension members 15 and 17 are arranged in planes transverse to one another.

In applying the device to indicate the strain on a casing screwer the member 17, for example, is placed over the bar 20 of the tongs for screwing up the casing and the other member 15 is connected to a line or jack 21 for pulling the tongs, the operation of screwing up the casing proceeding in well known manner by intermittent pull on the said line or jack, and at each operation, the pressure exerted on the tongs is indicated on the pressure gage, suitable allowance being made for the effective length of the tongs and for the diameter of the piston in the dynamometer. By observing the indications of the dynamometer the operator may be sure that no excessive pressure is brought on the casing, or if the casing is defective and breaks or yields under a pressure which is not excessive, the indications of the dynamometer may be used as evidence to show the defective nature of the casing.

What I claim is:

A dynamometer comprising a cylinder, having one end closed, and a pressure gage communicating with the interior of the cylinder, a piston slidably mounted in said cylinder, and having extensions at its outer end, a U-formed stirrup having bars extending alongside the cylinder and through said extensions on the cylinder, a member extending beneath the cylinder, a U-formed stirrup having bars extending alongside the cylinder and through said member, and nuts on said bars respectively engaging the extensions and the said member, said cylinder having longitudinal grooves in which said bars engage to hold the parts in alinement.

In testimony whereof, I have hereunto set my hand at Maricopa, California, this 18th day of October, 1911.

ROSCOE WILLIAM STEPHENS.

In presence of—
  M. N. ROBERTSON,
  H. F. MITCHELL.